United States Patent [19]
Leniton

[11] Patent Number: 5,853,835
[45] Date of Patent: Dec. 29, 1998

[54] LAMINATED AND BEVELED SAFETY GLASS PANEL

[76] Inventor: Scott J. Leniton, 12046 Bethwood Ave., New Port Richey, Fla. 34668

[21] Appl. No.: 944,724

[22] Filed: Oct. 6, 1997

Related U.S. Application Data

[63] Continuation-in-part of Ser. No. 598,964, Feb. 9, 1996, abandoned.

[51] Int. Cl.$^6$ ........................................................ B44F 1/06
[52] U.S. Cl. ................................ 428/38; 52/311.2; 52/314
[58] Field of Search ........................... 428/38; 52/311.2, 52/314; 156/63

[56] References Cited

U.S. PATENT DOCUMENTS

| | | | |
|---|---|---|---|
| 4,194,669 | 3/1980 | Bromberg | 428/38 |
| 4,488,919 | 12/1984 | Butler | 428/38 |
| 4,904,513 | 2/1990 | Nicolo | 428/38 |
| 5,098,760 | 3/1992 | Fletcher | 428/38 |

OTHER PUBLICATIONS

Definition of "tempered", Hackh's Chemical Dict. Sep. 1977.
Definition of "Anneal", Hackh's Chemical Dict. Sep. 1977.

*Primary Examiner*—Alexander Thomas

[57] ABSTRACT

The disclosure relates to a laminated and beveled safety glass panel. More particularly, the safety glass panel comprises a panel having the appearance of a leaded glass panel that meets safety glass requirements. The glass panel is preferably constructed by taking an outer panel and bonding to it an inner glass panel, preferably annealed, having a glass joiner therebetween. At least one groove is machined into the outer glass panel and/or the inner glass panel simulating separate glass panel sections. Within the groove a bead, preferably formed of lead, is adhesively placed thereby yielding an overall beveled and leaded appearance.

3 Claims, 3 Drawing Sheets

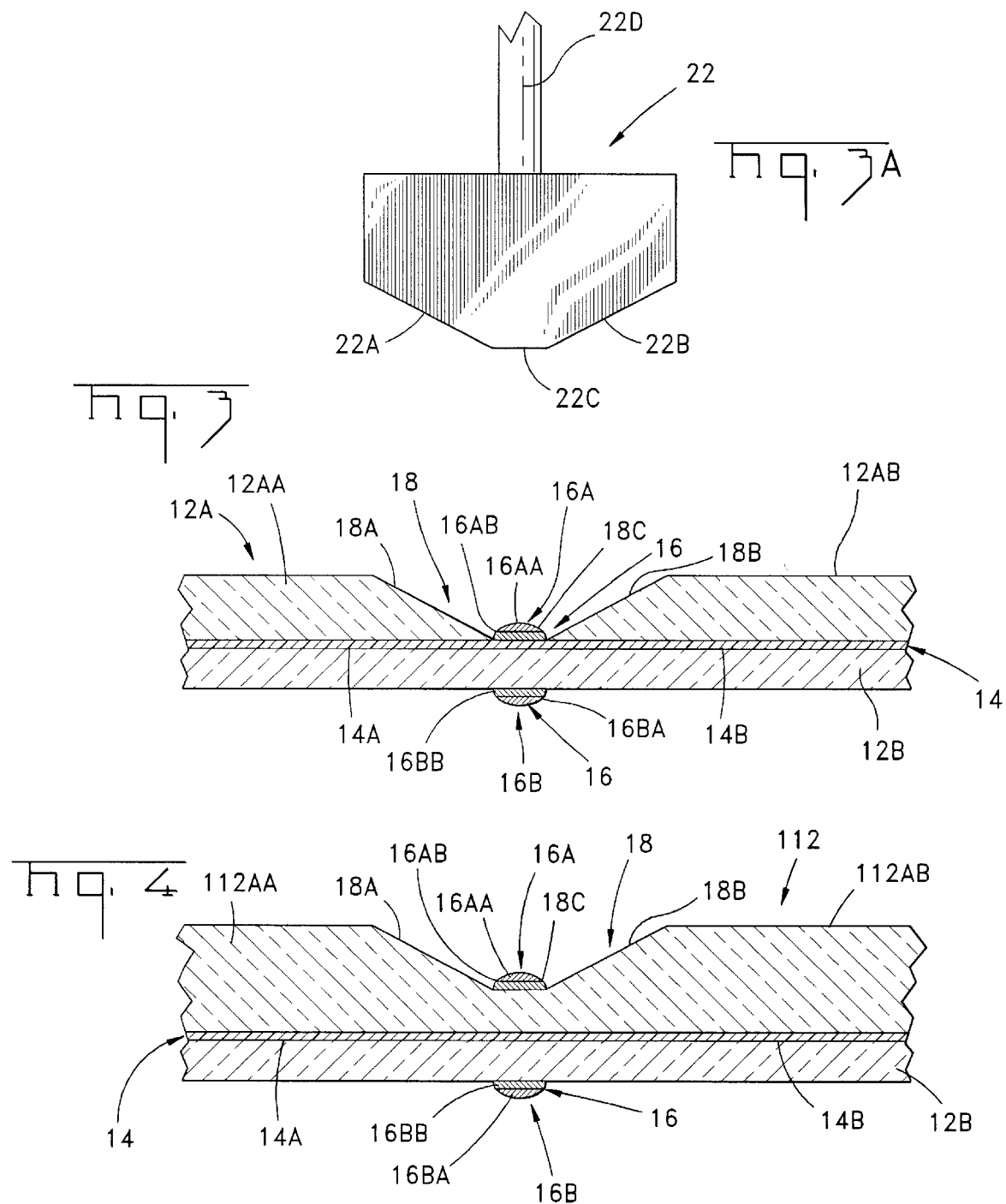

5,853,835

LAMINATED AND BEVELED SAFETY GLASS PANEL

This application is a continuation-in-part of Ser. No. 08/598,964, filed Feb. 9, 1996, and entitled "Safety Glass Panel," now abandoned.

RELATED APPLICATION

1. Field of Invention

The present invention relates to a decorative, laminated and beveled glass panel, more particularly to a laminated glass panel that has the appearance of a leaded glass, but meets safety glass requirements for resistance to hurricane force winds.

2. Background of the Invention

Traditional leaded glass panels are made by cutting and fitting individual pieces of glass to form a pattern. The pieces are held together by using H-shaped lead cames which are soldered together where they intersect. The hand manufacturing process can be labor intensive and costly. The design results in a weak structure and over time the cames become a poor environmental seal. Many building codes effectively prohibit the standard leaded glass construction due to its propensity to launch large pieces of glass into or from a structure when subjected to missile impact or from excessive pressure, such as from hurricane force winds.

During recent hurricanes traditional leaded glass panels were found to be too weak to withstand the forces of the hurricane and air borne objects carried thereby. At the present time, new building codes are requiring hurricane proof glass panes in public places. One such test procedure, in Dade County Florida, for example, uses a cannon to shoot a standard building stud, i.e. 2×4×8', at 30 mph at the test panel. Laminated glass is required to withstand this test, identified as South Florida Building Code (Revised 1994), Section 2315 IMPACT TESTS for windborn debris, Subsection 2315.2 Large missile impact test.

There are two types of safety glass generally available in the United States today, tempered glass and laminated glass. Tempered glass, through a process of controlled heating and cooling, has developed thereon a surface tension similar to the surface tension which creates a bubble. This gives the glass certain strength characteristics which allow the glass to "explode" into very small pieces when fractured. It is most vulnerable to fracture from a blow to the edge or to severe planar twisting. Tempered glass, however will explode when the surface is modified by grinding or milling to a degree where the process has sufficiently penetrated the surface tension lawyer.

The other type of safety glass is laminated glass. Here two pieces of any type of glass are bonded to an intermediate sheet of plastic, such as poly vinyl butyrate (PVB). The advantage of laminated glass is that the pieces of glass can break and the laminate layer will hold the resultant pieces in place, thus preventing any harm to humans. Further, the laminate layer, when of sufficient strength or thickness, may stay in place at the affected or broken area.

Numerous innovations for safety glass panels have been provided in the prior art that are described below. Even though these innovations may be suitable for the specific individual purposes to which they address, they differ from the present invention as will become apparent.

U.S. Pat. No. 5,205,884, discloses a method of making a stained glass type window and the window produced thereby. Pane members are cut into the required shapes arranged into the desired pattern and jointed together. The stained glass type arrangement is joined to a finishing pane and may be incorporated into an insulated or thermo-pane structure.

U.S. Pat. No. 5,098,760, discloses a simulated leaded glass panel which incorporates a glass backing sheet on which are mounted glass pieces having thin beveled edges and positioned in a desired pattern. The beveled pieces are affixed to the glass by liquid adhesive which may be activated by the application of U.V. light. Adhesive-backed lead strips are positioned to outline the beveled pieces on the underside of the glass sheet to achieve the desired effect of leaded glass.

U.S. Pat. No. 5,045,370, discloses a window pane employing beveled glass plates formed into a plurality of different clusters. Each cluster includes a connecting plate extending outwardly which has a standardized width that can be joined with a standard planar piece of beveled plate glass. Unique corner, link, and crown clusters are employed, each including a pair of connecting plates which are spaced apart the same distance as other connecting plates in adjoining clusters.

U.S. Pat. No. 4,904,513, discloses a component for window frames having a plurality of flat glass elements bonded to a flat transparent backing pane. The flat glass elements have chamfered edges placed side by side in order to achieve the appearance of "leaded lights".

U.S. Pat. No. 4,756,938, discloses a method of producing a laminated or resin bonded glazing unit comprising an exothermically setting resin material between a pair of spaced apart glazing panels and allowing the resin material to set, wherein one of the glazing panels is leaded stained or a decorative glazing panel.

U.S. Pat. No. 4,619,850, discloses a decorative glass window product including a sheet of glass, a metal design component in the form of a unitary, precast, reticulated came network, where the component is bonded on its inner surface to one side of the glass sheet, and a thin layer of an elastomeric adhesive bonding the component to the glass sheet.

U.S. Pat. No. 4,488,919, discloses a simulated beveled and leaded glass product which includes flat-bottomed, beveled grooves formed in the front surface of a pane of glass or plastic, forming design segments of unrelieved thickness surrounded by beveled grooves, and a plurality of lead strips bonded to the flat bottom walls of the grooves, thus enclosing the design segments and simulating beveled and leaded glass.

U.S. Pat. No. 4,194,669, discloses decorative leaded panels of transparent thermoplastic material, such as windows, made by affixing metallic lead strips to the surface of a thermoplastic sheet by solderable securing means, and then soldering to complete the joint.

Numerous innovations for safety glass panels have been provided in the prior art as noted above. Even though these innovations may be suitable for the specific individual purposes to which they address, they would not be suitable, and in fact do not represent commercial products, for the purposes of the present invention. In contrast to the prior art, the present invention provides an individual pane look by milling grooves into a single pane of safety glass having multiple layers of glass to simulate leaded glass. A nonstructural bead simulating the came of leaded glass is applied to the bottom of the groove to complete the leaded simulation. In a second embodiment of the top pane of safety glass the minimum thickness at the bottom of the groove satisfies the safety glass requirements. As a consequence of the preferred method of manufacture, the present invention has cost advantages and satisfies the requirements of safety glass.

The manner by which these advantages are achieved will become apparent in the description which follows, particularly when read in conjunction with the accompanying drawings.

SUMMARY OF THE INVENTION

The present invention relates to decorative leaded glass panels, more particularly, the invention relates to a manufactured glass panel having the appearance of beveled and leaded glass and meets safety glass requirements. The invention hereof is preferably constructed by taking an outer glass panel and bonding it to an inner glass panel having a glass joiner therebetween, such as PVB. At least one groove is machined into the outer glass and/or the inner glass panel simulating separate glass panels. Within the groove, a bead preferably constructed from lead, is adhesively placed thereby yielding an overall beveled glass appearance.

The present invention solves a long felt need for an architecturally appealing beveled and leaded glass that is cost effective to manufacture and can be installed in areas where building codes require safety glass.

The present invention produced unexpected results, namely, existing leaded glass panels can be replaced with cosmetically pleasing alternatives without major reconstruction of existing frameworks.

Accordingly, it is an object of this invention to satisfy stringent building code specifications for glass in doors with a cost effective simulated leaded glass.

Still another object hereof is the provision of a beveled and leaded glass appearance for a safety glass base which meets stringent building code requirements for hurricane proof door glass.

BRIEF DESCRIPTION OF DRAWINGS

FIG. 3 is a cross-sectional view along line 3—3 of FIG. 2, exhibiting a glass panel having a machined groove and bead attached thereto.

FIG. 3A is a cross-sectional view of a router bit for providing the grooves in the glass panels.

FIG. 4 is a cross-sectional view similar to FIG. 3 exhibiting an alternate embodiment of an outer glass panel.

DETAILED DESCRIPTION OF PREFERRED EMBODIMENT

Figure 1:
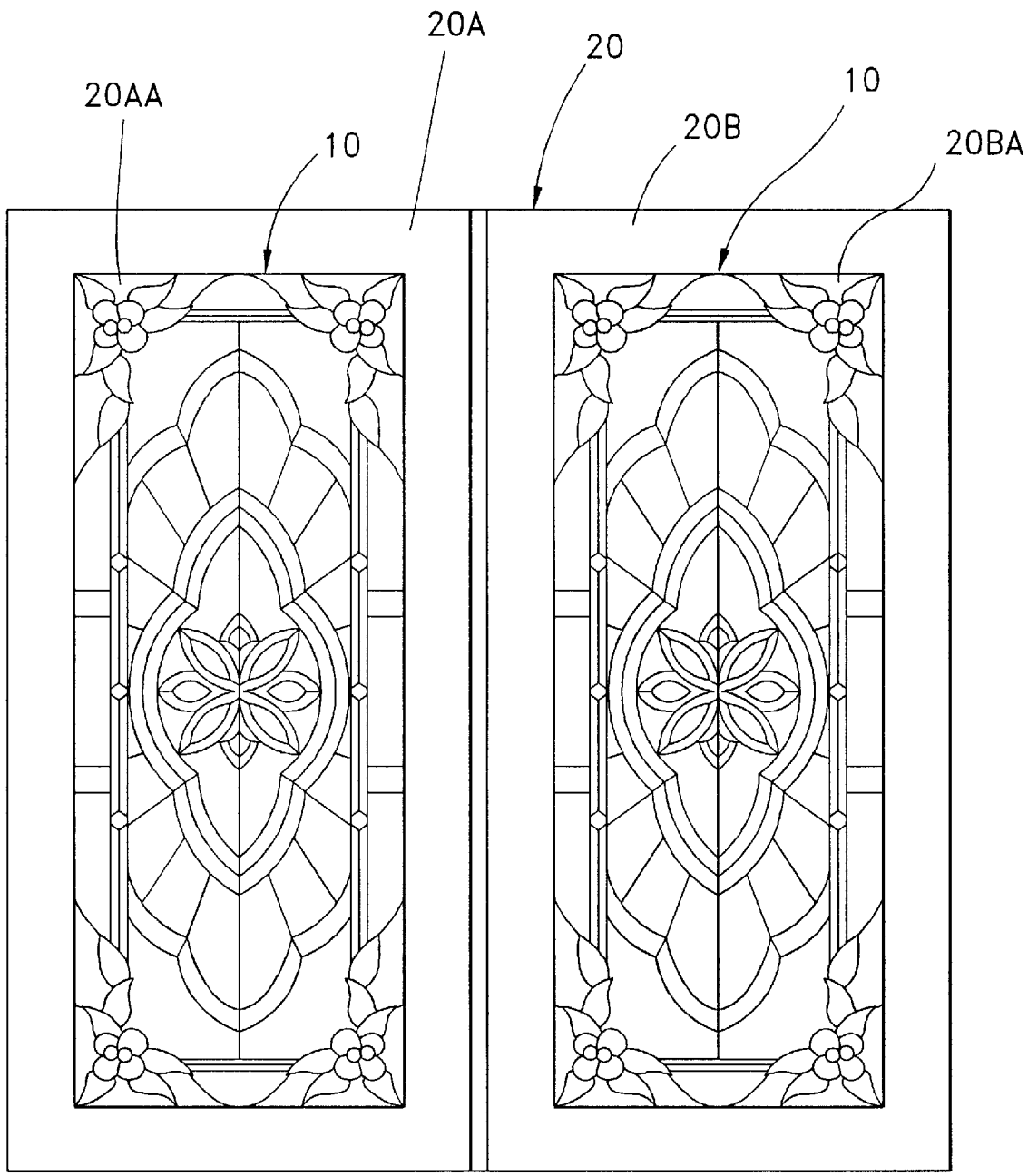
FIG. 1 is a front view of a dual door assembly having a left and right leaded glass panel.

The present invention is directed to a laminated and beveled safety glass panel, such as for a door or window, as illustrated in the several views, where like reference numerals represent the same components or features throughout the Figures.

Referring first to FIG. 1, which is a perspective view of a safety glass panel 10 installed in a door 20, where the door 20 comprises a left door 20A and a right door 20B functioning to provide access to an area of a house, for example. The left door 20A comprises a door panel opening 20AA having fastening means around an inner circumference functioning to fasten a safety glass panel 10 by an outer circumference. The right door 20B is similarly constructed having a door panel opening 20BA.

Figure 2:
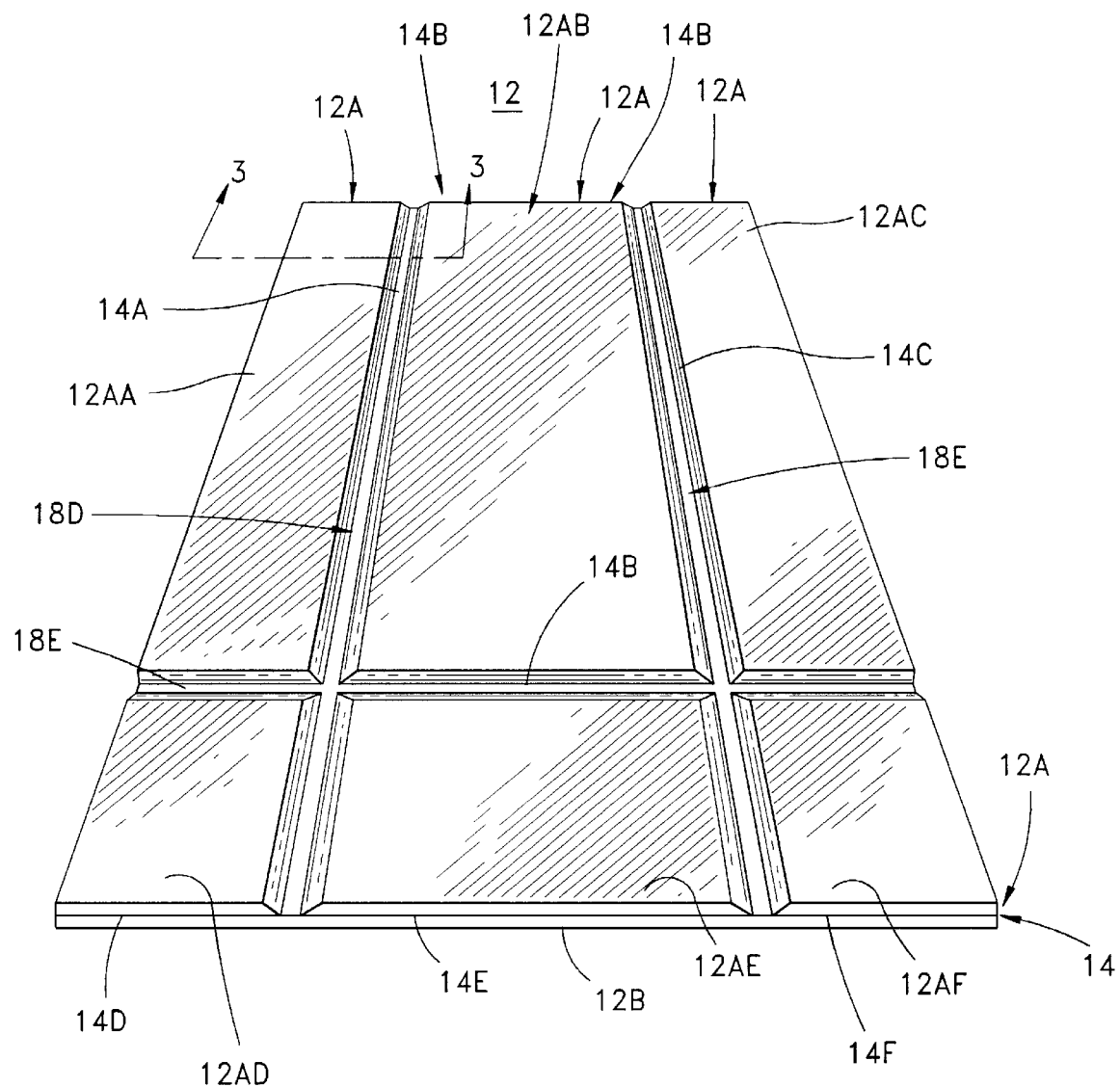
FIG. 2 is a perspective view of a glass panel having grooves machined thereon.

In FIG. 2, there is illustrated a glass panel 12 comprising an outer glass panel 12A laminated at an inner distal side to an inner glass panel joiner 14. The glass panel 12 functions to provide a decorative appearance of leaded glass to satisfy requirements for safety glass. The outer glass panel 12A comprises a first vertical groove 18D, a second vertical groove 18E, and a first horizontal groove 18F. The respective grooves are manufactured by a grinding process which functions to divide the outer glass panel 12A into a plurality of outer glass panels 12AA, 12AB, 12AC, 12AD, 12AE 12AF, which are adjacent to one another. The groove provides a cosmetic line of demarcation which when combined with a decorative outer bead. 16A, as shown in FIG. 3, functions to give the appearance of a beveled and leaded glass.

FIG. 3 features an outer glass panel 12A comprising a machined groove 18 separating the outer glass panel 12A into the outer glass panel upper left 12AA and the outer glass panel upper middle 12AB. The outer glass upper left 12AA and the outer glass upper middle 12AB function to provide a cosmetically pleasing appearance when taken in conjunction with the groove 18 and the bead 16. The groove 18 comprises a left wall 18A which is downwardly angled with respect to the horizontal surface of the outer glass upper left 12AA. The groove left wall 18A is formed by a rotating router bit 22 such that a router bit left cutting edge 22A forms the groove left wall 18A. A groove right wall 18B is formed by a rotating router bit 22 such that a router bit right cutting edge 22B forms the groove right wall 18B. A groove base 18C is formed by a rotating router bit 22 such that the router bit flat cutting edge 22C forms the groove base 18C.

The bead 16 comprises a decorative outer bead 16A functioning to provide a decorative appearance simulating a came of a leaded glass panel. The decorative outer bead 16A comprises a decorative outer bead strip 16AA securely applied to an outer distal side of a decorative outer bead adhesive 16AB. The inner distal side of the decorative bead adhesive 16AB is securely applied to the groove base 18C.

The bead further comprises a decorative inner bead 16B applied on an inner distal side of an inner glass panel 12B juxtaposed to the decorative outer bead adhesive 16AB, which functions to provide a decorative appearance simulating a came of a leaded glass pane. The decorative inner bead 16B comprises an inner bead strip 16BA securely applied to an outer distal side of a decorative inner bead adhesive 16BB. The inner distal side of the decorative inner bead adhesive 16BB is securely applied to the inner distal side of the inner glass panel 12B.

The outer glass panel 12A is securely fastened to the inner glass panel 12B by the glass joiner 14, such a methacrylic adhesive layer, or poly-vinyl-butenal (PVB), manufactured by Monsanto. The glass joiner 14 may be made from colored materials. Further, the glass joiner 14 may have optical properties but not limited to transparent, translucent. opaque and optical texturing.

In FIG. 3A there is illustrated a router bit 22 fixed in a rotating machine tool chuck by a shaft 22D. The router bit 22 is rotated by a machine tool, whereby to cut the groove 18 in outer glass panel 12A. The cutting edge 22A functions to cut the groove wall 18A, while the cutting edge 22B functions to cut the groove wall 18B. Finally, the flat cutting edge 22C functions to cut the groove base, preferably down to the joiner layer. The respective cutting edges may be shaped and proportioned to achieve a decorative appearance in the groove. For example, as an alternative, the router bit may be configured like a wheel with a beveled rim to produce a different shaped groove.

Referring now to FIG. 4, which is a cross-sectional view similar to FIG. 3, exhibiting an alternate embodiment of an outer glass panel, said embodiment comprising a glass panel 12 having a second outer glass panel 112A with a machined groove 18. The groove 18 functions to divide the second outer glass panel 112A into an outer glass panel upper left 112AA and an outer glass panel upper middle 112AB. The groove 18 comprises a pair of angled walls 18A, 18B, and a base 18C, where such groove is preferably formed by a router bit, as described above. The depth of the groove 18 is such that the minimum thickness of the second outer glass panel 112A between the groove base 18C and the inner distal side of the second outer panel 112A satisfies the requirements of safety glass, such as the Dade County, Florida code test, wherein a standard 2×4 building stud is shot from a cannon against the glass panel. In a specific embodiment, an annealed glass panel 1/8" thick, joined to a beveled and leaded second tempered glass panel 1/8" thick by an intermediate layer of PVB, the laminated and beveled glass safety panel withstood the impact of the Dade County test.

The alternative embodiment also includes a bead 16 comprising a decorative outer bead 16A which functions to provide a decorative appearance simulating a came of a beveled and leaded glass panel. The decorative outer bead 16A comprises a decorative outer bead strip 16AA securely applied to an outer distal side of a decorative outer bead adhesive 16AB. The inner distal side of the decorative outer bead adhesive 16AB is securely applied to the groove base 18C. The bead 16 further comprises a decorative inner bead 16B applied on an inner distal side of an inner glass panel 12B juxtaposed to the decorative outer bead adhesive 16AB which functions to provide a decorative appearance simulating a came of a leaded glass panel.

One major advantage of the preferred combination hereof, namely, a laminate of annealed glass and tempered glass, is the ability to mill into the annealed side and yet have an increased resistance to fracture from a concussion, such as a slamming door, due to the strength of the tempered glass component.

While the invention has been illustrated and described as embodied in a laminated and beveled safety glass panel, it is not intended to be limited to the details shown, since it will be understood that various changes, modifications and substitutions may be made by those skilled in the art without departing from the spirit and scope of this invention.

I claim:

1. A laminated and beveled glass panel, offering resistance to hurricane force winds, comprising a first tempered glass panel and a second annealed glass panel with an intermediate layer of resin therebetween, at least a first beveled groove in said second annealed glass panel in communication with said layer of resin, a first adhesive backed lead strip in said first beveled groove in contact with said layer of resin and at least a portion of the respective beveled sides of said grooves, and a second adhesive backed lead strip vertically aligned with said first adhesive backed lead strip along the outer surface of said first tempered glass panel.

2. The laminated and beveled glass panel according to claim 1, wherein said respective sides of said groove form an obtuse angle greater than 90 degrees.

3. The laminated and beveled glass panel according to claim 1, wherein said first beveled groove isolates said second glass panel into panel segments, whereby said segments may have different colors to provide an artistic or aesthetically pleasing appearance to the laminated and beveled glass panel.

* * * * *